US007976300B2

(12) United States Patent
Matthes et al.

(10) Patent No.: US 7,976,300 B2
(45) Date of Patent: Jul. 12, 2011

(54) PELLETING MACHINE

(75) Inventors: Michael Matthes, Berlin (DE); Jörg Reiche, Kleinmachnow (DE); Helmut Haase, Fehrbelling/Ot Linum (DE)

(73) Assignee: Korsch AG, Berlin (DE)

( * ) Notice: Subject to any disclaimer, the term of this patent is extended or adjusted under 35 U.S.C. 154(b) by 140 days.

(21) Appl. No.: 12/300,250

(22) PCT Filed: May 7, 2007

(86) PCT No.: PCT/EP2007/054411

§ 371 (c)(1), (2), (4) Date: Mar. 18, 2009

(87) PCT Pub. No.: WO2007/131906

PCT Pub. Date: Nov. 22, 2007

(65) Prior Publication Data

US 2010/0015272 A1 Jan. 21, 2010

(30) Foreign Application Priority Data

May 11, 2006 (DE) ........................ 10 2006 023 333

(51) Int. Cl.
*B29C 43/08* (2006.01)

(52) U.S. Cl. ............. 425/78; 425/256; 425/345; 141/71

(58) Field of Classification Search .................... 425/78, 425/256–261, 344–355; 141/71
See application file for complete search history.

(56) References Cited

U.S. PATENT DOCUMENTS

| | | | | |
|---|---|---|---|---|
| 2,970,554 | A | 2/1961 | Haupt | |
| 3,577,842 | A | 5/1971 | Nakai et al. | |
| 4,485,284 | A | 11/1984 | Pakulis | |
| 5,213,816 | A * | 5/1993 | Smyth et al. | 425/257 |
| 5,858,415 | A * | 1/1999 | Bequette et al. | 425/258 |

FOREIGN PATENT DOCUMENTS

DE 198 51 527 A1 11/2000

* cited by examiner

*Primary Examiner* — Richard Crispino
*Assistant Examiner* — Thu Khanh T Nguyen
(74) *Attorney, Agent, or Firm* — Norris, McLaughlin & Marcus, P.A.

(57) ABSTRACT

A pelleting machine has a die table having at least one die plate, dies associated with the die plate and a feed device for feeding a material to be pressed into the die plates. The feed device includes a feed shoe arranged substantially parallel to a surface of the die table and has at least one feed opening which is arranged or can be arranged in the region of the die plates. The pelleting machine includes a sealing device disposed between the feed shoe and the die table. The sealing device has at least one sealing element forming the contour of the feed opening, wherein a force acting in the direction of the die table is applied to the sealing element.

13 Claims, 5 Drawing Sheets

PELLETING MACHINE

Figure 1:
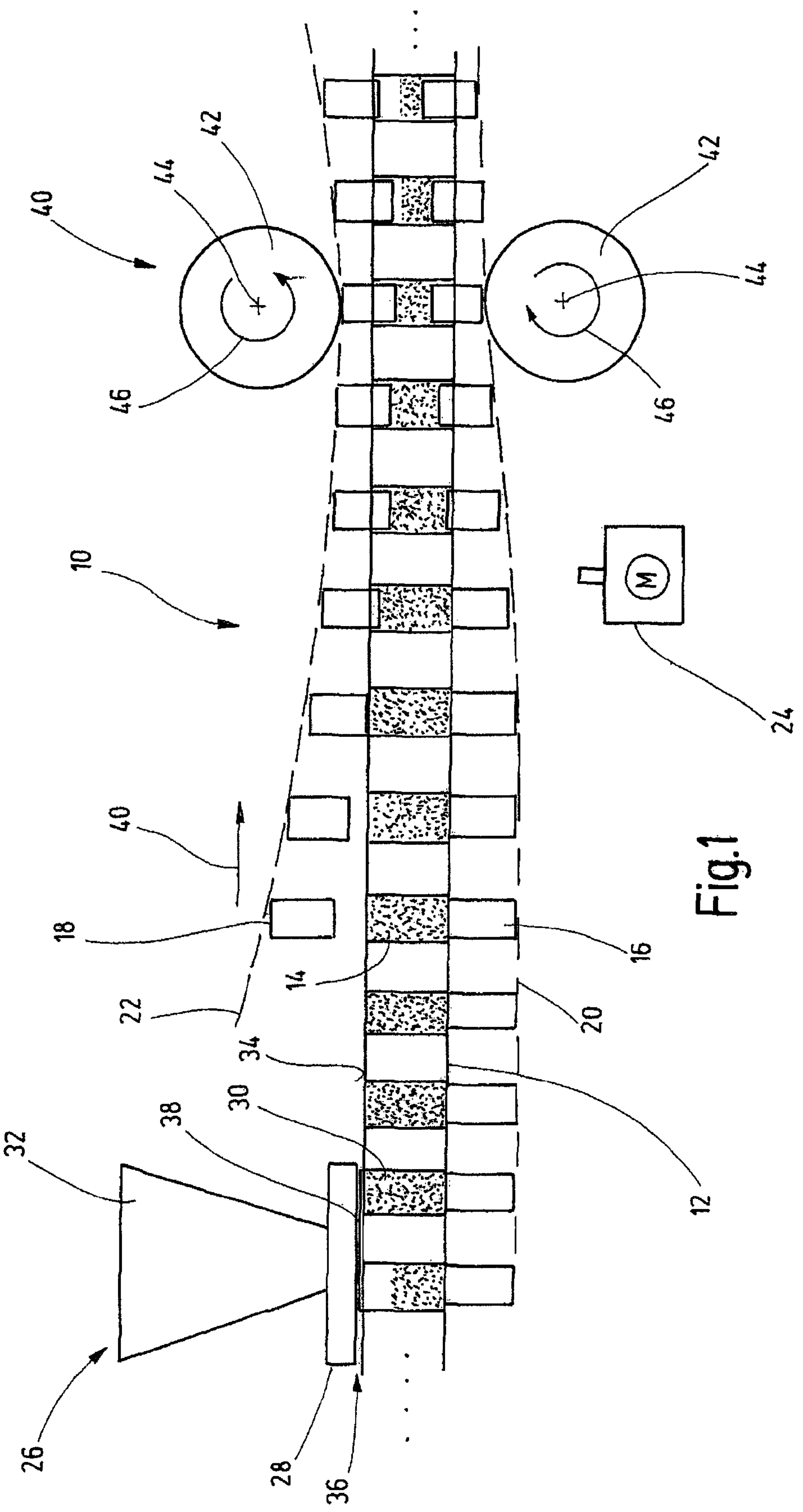

This application is a 371 application of PCT/EP2007/054411 filed May 7, 2007, which claims priority to the German application 10 2006 023 333.6 filed May 11, 2006.

The invention relates to a pelleting machine with a die table having at least one die plate, and a feed device for feeding a material to be pressed into the die plates, and a feed shoe for a pelleting machine and a sealing device for a feed shoe.

Pelleting machine of the aforedescribed type are known. For example, in rotary pelleting machines, a rotor supporting the die table is rotated by a drive. The die plates are filled with the material to be pressed through at least one so-called feed shoe, and bottom dies and top dies guided by slideways are moved to the die plates depending on the angular position of the rotor. The top dies and bottom dies are guidedly moved past at least one press station, typically a pre-press station and a main press station. The top dies and bottom dies are essentially tangentially guided past stationarily arranged pressure rollers, so that a force can be applied to the pressed material introduced into the die plates.

Such rotary pelleting machines are employed, inter alia, in the manufacture of pharmaceutical, chemical and technical pressed articles. Zero-loss manufacture free from contamination is particularly important in these fields, but also in other applications. In addition, the rotary pelleting machine should be easily cleanable.

In particular, a tightly sealed arrangement is required when the material to be pressed is introduced into the die plates through the feed shoe, in order to prevent material from exiting and contaminants from entering the material to be pressed. It is known to provide sealing strips between feed shoe and die table, which are typically arranged at the bottom side of the feed shoe and spaced from the at least one feed opening. These sealing strips essentially scrape along the surface of the die table during its location. Gaps, cavities, dead spaces, pockets and the like may exist between the feed opening and the sealing strip, which are filled with the material to be pressed during normal operation, causing additional sealing problems.

It is therefore an object of the invention to provide a pelleting machine, a feed shoe and a sealing device of the aforedescribed type, which has a simple design and is able to provide an effective seal between the feed device for the material to be pressed and the die table.

The object is solved by the embodiments described hereinbelow. The gap between the feed shoe and the die table can be effectively sealed by arranging a sealing device between the feed shoe and the die table which includes an sealing element forming the contour of the feed opening, wherein a force acting in the direction of the die table is applied to the sealing element. The sealing element is preferably biased by a spring force and supported on the die table by a small pressure, thereby preventing discharge of the material to be pressed and admission of contaminants. Moreover, by having the sealing device define the feed opening directly, any cavities, dead spaces, pockets and the like—in which the material to be pressed could accumulate—are eliminated.

In a preferred embodiment of the invention, the sealing element forming the contour of the feed opening is attached to a base body of the feed shoe with a spring element, which is preferably formed as a profiled ring. A defined position of the sealing element can then be easily attained, so that the sealing element can assume a defined position in addition to correctly shape the feed opening. The sealing element thereby optimally maintains the desired sealing properties. The spring element operates also as a fastening element of the sealing element forming the contour of the feed opening, so that additional fastening means, for example the screws and the like, need no longer be provided.

According to a preferred embodiment of the invention, for receiving the profiled ring operating as a spring element and fastening element, the sealing element forming the contour of the feed opening and the feed shoe form seats which are complementary to the shape of the profiled ring. These seats are preferably formed as circumferential grooves having an open marginal edge. The sealing element forming the contour of the feed opening can then be easily installed without tools and be self-adjusting. Moreover, the restoring characteristic of the sealing element can be adjusted by way of the position and the shape of the seat and the profiled ring. Defined spring forces and hence pressures of the sealing element on the die table can then be attained. The sealing element can then also automatically adjust, for example, to compensate for changes in the surface properties of the die table or the sealing element due to wear.

According to another preferred embodiment of the invention, the contours of the feed shoe or of the sealing element, respectively, receiving the profiled ring are configured so that installation is possible from only one side of the feed shoe, preferably from the side facing the die table. This prevents wrong installations. On the other hand, the sealing element can then also be prevented from being pushed out or the like when the pelleting machine is operated as intended.

According to a preferred embodiment of the invention, both the sealing element forming the contour of the feed opening and the spring element can also be made from materials compatible with the manufacturing processes performed with the pelleting machine, in particular from temperature-stable materials, and materials which are inert with respect to the powder to be pressed and the like.

According to the invention, the object is further solved by a feed shoe having the features described hereinbelow and a sealing device having the features described hereinbelow. With the at least one sealing element forming the contour of at least one feed opening of the feed shoe, which is releasably coupled or can be releasably coupled with the base body of the feed shoe, and/or which is connected in such a way that a force directed away from the base body operates on the at least one sealing element, the at least one feed opening can advantageously be modified by exchanging the at least one sealing element in a variety of ways, without neutralizing the intended sealing effect. In particular, a cross-section of the opening, for example a width and/or a length of the at least one feed opening, can be easily adjusted by exchanging the sealing element. In addition, retaining stages or the like can be placed in the feed opening. Moreover, several sealing elements may be arranged in the at least one feed opening side-by-side and/or sequentially. This shows that there are a number of ways to adapt the feed opening to the pressed articles to be pressed.

Figure 2:
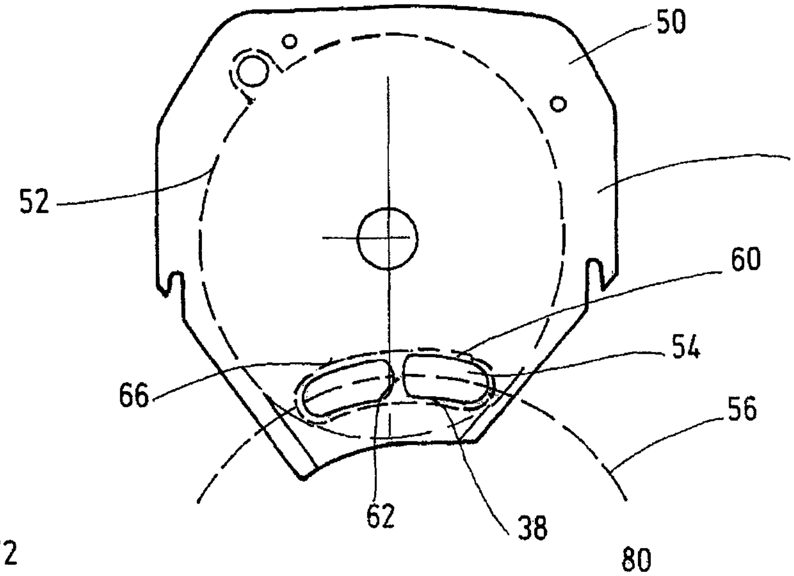
Figure 3:
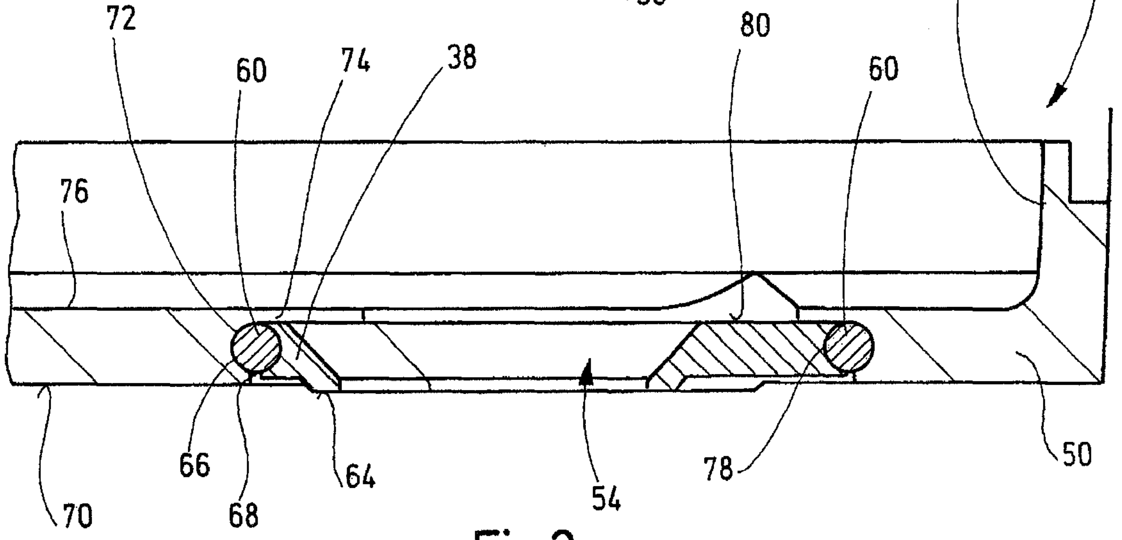
Figure 4:
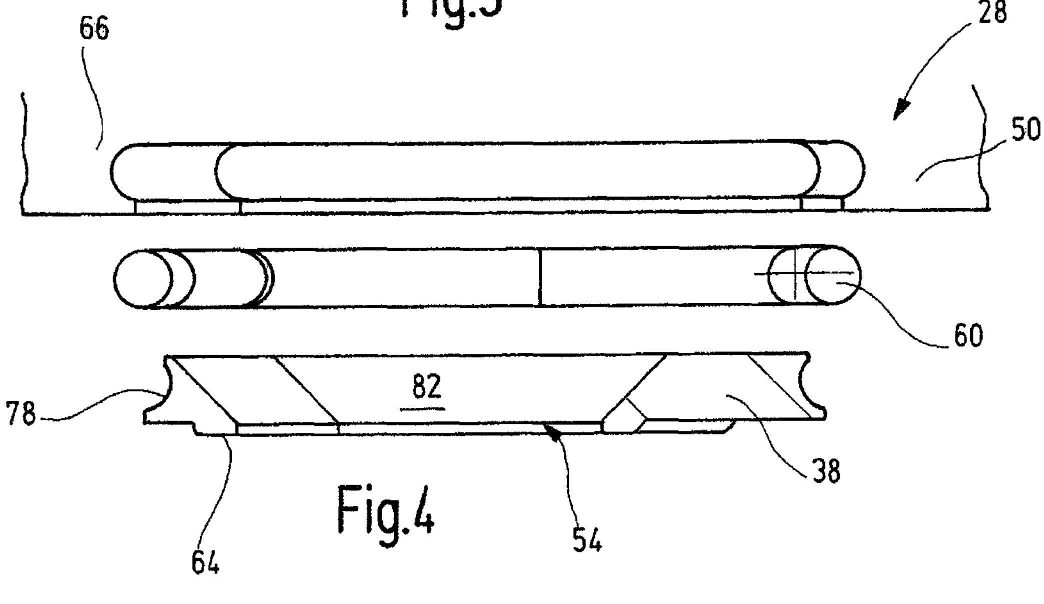
Figure 5:
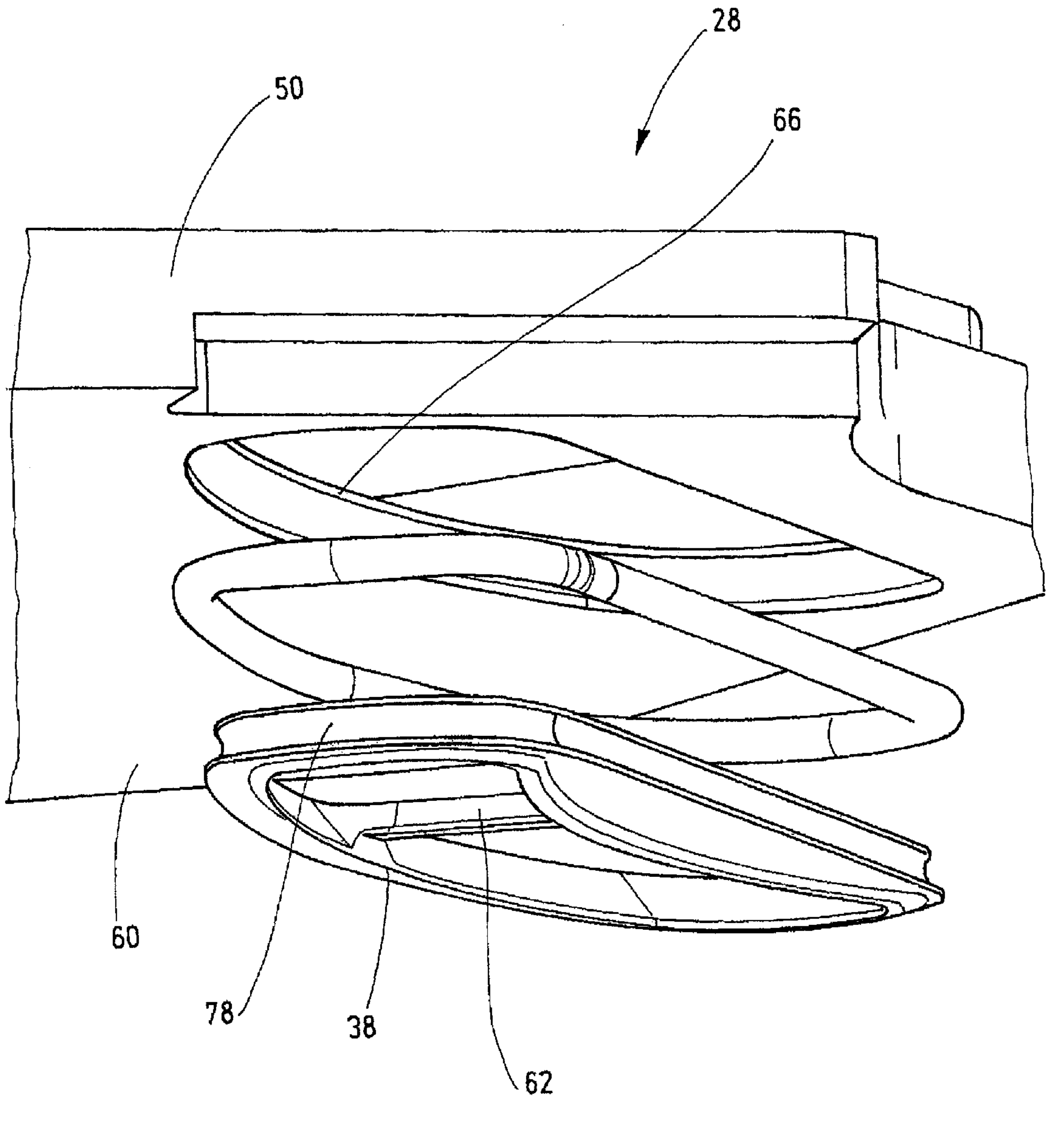
Figures 6, 7:
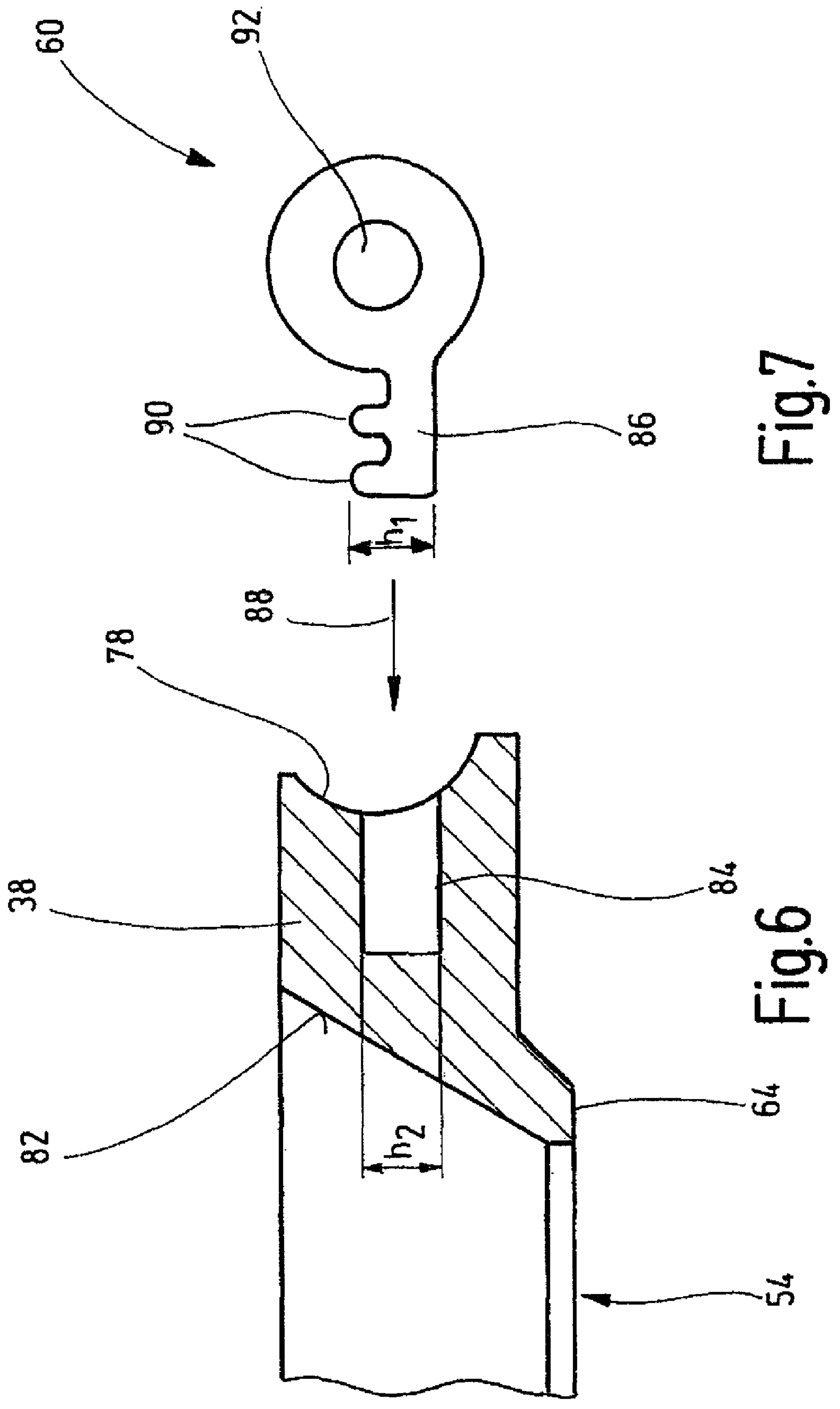

Additional preferred embodiments of the invention are recited as features of the dependent claims. An exemplary embodiment of the invention will now be described with reference to the appended drawings, which show in:

FIG. 1 a schematic partial diagram of a rotary pelleting machine;

FIG. 2 a schematic top view of a feed shoe;

FIG. 3 a cross-sectional diagram to the feed shoe;

FIG. 4 a cross-sectional diagram through an exploded view of the feed shoe;

FIG. 5 a partial exploded view of the feed shoe;

FIG. 6 a cross-sectional diagram through the marginal region of an insert of the feed shoe;

FIG. 7 a cross-sectional diagram through a profiled ring; and

Figure 8:
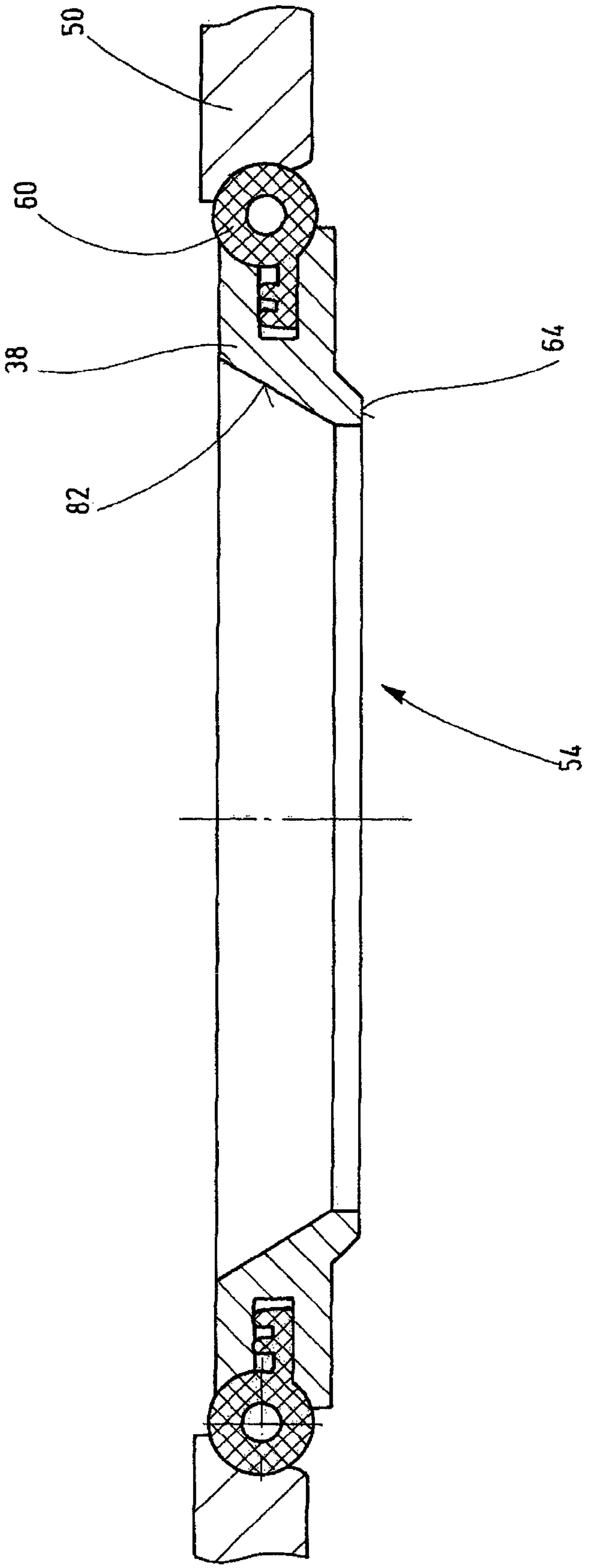

FIG. 8 a cross-sectional diagram through a feed shoe with installed sealing elements.

Rotary pelleting machines of the aforedescribed type are generally known, so that their basic structure and their basic function need not be described in detail in the context of the present description.

FIG. 1 shows a schematic partial diagram of a die table 12 of a rotary pelleting machine having the overall reference symbol 10. The die table 12 has a plurality of spaced-apart die plates 14 arranged along its circumference. A bottom die 16 and a top die 18, which are guided by the indicated sideways 20 and 22, respectively, are associated with each die plate. The die table 12 and bottom die 16 as well as top die 18 rotate here synchronously about the rotation axis of the die table 12. The die table 12 is rotated by the indicated electric drive apparatus 24.

A pressed material 30, which is only schematically indicated, is filled in the die plates 14 through a feed device 26 having a so-called feed shoe 28. In normal operation of the rotary pelleting machine 10, the pressed material 30 is filled to the entire height of the die plates 14. The fill height can be defined, for example, by the height position of the bottom die 16 on an unillustrated stripping station.

The feed shoe 28 is connected with a storage container 32 from which the pressed material 30 is supplied to the feed shoe 28. The feed shoe 28 has a feed opening (not visible in FIG. 1) through which the material 30 is supplied to the die plate 14. Typically, rotating metering wheels, baffles, dams and the like are arranged inside the feed shoe 28 for steadily supplying the pressed material 30.

The feed shoe 28 is arranged parallel to a surface 34 of the die table 12. A gap 36 is formed between the feed shoe 28 and the die table 12, so that the feed shoe 28 does not directly contact the die table 12 while the die table 12 is rotating. An sealing element 38, which is only schematically shown in FIG. 1, but described in more detail in the subsequent Figures, is arranged in the region of the feed opening. The sealing element 38 forms the contour of the feed opening and is biased by a spring force operating in the direction of the die table 12, urging the sealing element 38 into contact with the surface 34 of the die table 12. The spring force applied to the sealing element 38 and urging the sealing element 38 in the direction of the die table 12 is sized so as to provide only slight contact. Contact between the sealing element 38 and the die table 12 is intended to seal the gap 36 in the region of the feed opening.

The bottom die 16 and the top die 18 enter the die plate 14 following the course of the slideways 20 and 22, and press the pressed material 32 to form the desired tablet or the like. The bottom die 16 and the top die 18 are here guided past at least one press station 40, which includes stationary pressure rollers 42. The pressure rollers 42 are each supported for rotation about a rotation axis 44. The distance between the pressure rollers 42 is preset and essentially determines the height of the tablet to be pressed. The pressure rollers 42 are driven in the direction of arrow 46—the upper pressure roller 42 counterclockwise, the lower pressure roller 42 clockwise—by moving the bottom die 16 or the top die 18, respectively, commensurate with the movement direction 48 of the die table 12.

FIG. 2 shows schematically a bottom view of the feed shoe 28. In other words, FIG. 2 shows a top view on the feed shoe 28 as seen from the direction of the die table 12. The feed shoe 28 includes a base body 50 having a recess 52 formed therein. The recess 52 is open on a side facing away from the die table and can be closed by a plate (not shown in detail). The recess 52 is essentially circular. The unillustrated metering wheel rotates inside the recess 52. The feed opening 54 is formed at the bottom of the recess 52. The feed opening 54 is formed as a circular arc, wherein an imaginary curved line of the feed opening 54 is coincident with a circular path 56 of the die plates 14 indicated in FIG. 2. The sealing element 38, which is arranged within the base body 50 of the feed shoe 28 above a spring element formed as a profiled ring 60, defines a contour 58 of the feed opening 54. The sealing element 38 has one or several center webs 62 which connect the two longitudinal sides of the sealing element 38 with each other. The center web 62 is hereby recessed from the contact surface 64 (FIG. 3) facing the die table 12, preventing the center web 62 from contacting the die table 12. The center web 62 is provided to fix the position of the sealing element 38 in a receiving groove 66 of the feed shoe 28. According to another embodiment (not illustrated), the center webs may also contact the die table 12.

FIG. 3 shows a cross-sectional diagram through the feed opening 54. Elements identical to those in the preceding Figures have the same reference symbols and will not be described again.

The diagram of FIG. 3 shows that the base body 50 forms a receiving groove 66 for the profiled ring 60. The receiving groove 66 transitions from a first segment 68—which is substantially perpendicular to the bottom side 70 of the base body 50—into a circular segment 72 and from there into a third segment 74 which is parallel to the segment 68. The segments 68 and 74 of the receiving groove 66 are not located in the same plane. The segment 74 is here displaced further towards the feed opening 54, thereby creating a step between the bottom side 70 and the bottom 76 of the recess 54.

The sealing element 38 also forms a guide groove 78 for the profiled ring 60. The guide groove 78 is formed along the circumferential edge of the sealing element 38. The sealing element 38 itself has a dimension which—when the sealing element 38 is inserted in the feed shoe 28—is smaller than the distance between the opposing segments 68 of the receiving groove 66 and greater than the distance between the opposing segments 74 of the receiving groove 66. The sealing element 38 can then be inserted in the base body 50 of the feed shoe 28 only from one side, namely from the bottom side 70.

The top side 80 of the sealing element 38 is flush with the segment 74 of the receiving groove 66. The sealing element 38 can then be arranged above the contact surfaces 64, with only a small pressure exerted on the surface 34 of the die table 12, when the feed shoe 28 is mounted on the rotary pelleting machine 10. The sealing element 38 is urged against the feed shoe 28. The profiled ring 60 which operates as a spring element, exerts a corresponding counterforce on the sealing element 38, thereby biasing the sealing element 38 against the die table 12.

FIG. 4 shows a cross-sectional diagram the sealing element 38, the profiled ring 60 and the base body 50 of the feed shoe 28 once more in an exploded view. The diagram of the sealing element 38 indicates that an inner surface 82 of the sealing element 38 is shaped as a funnel, which aids in feeding of the pressed material into the die plates 14.

This demonstrates that the contour of the feed opening 54 is determined by the sealing element 38. The contact surfaces 64 directly abut the feed opening 54, so that the gap 36 (FIG. 1) is also sealed directly at the feed opening 54.

The exploded perspective view shown in FIG. 5 shows again more clearly the sealing element 38, the profiled ring 60, and the base body 50 of the feed shoe 28. The sealing element 38 is installed so as to mechanically interlock with the base body 50, establishing a form-fit by way of the profiled ring 60. The sealing element 38 is subjected to a holding force due to the elasticity of the profiled ring 60. At the same time, the profiled ring 60 assumes the function of a spring element when the feed shoe 28 is installed.

FIGS. 6 and 7 illustrate another, optional design of the profiled ring 60 (FIG. 7) and of the guide groove 78 of the sealing element 38 (FIG. 6).

FIG. 6 shows a cross-sectional view through a marginal region of the sealing element 38, and FIG. 7 shows a cross-sectional view through a profiled ring 60. The Figures show that the guide groove 78 includes an annular groove 84 extending into the base body 38. The profiled ring 60 forms an annular bead 86 which—as illustrated by arrow 88—can be inserted into the annular groove 84. The annular bead 86 includes nose-shaped, spaced-apart projections 90 extending in one direction. A height h.sub.1 of the nose-shaped projections 90 is slightly greater than a height h.sub.2 of the annular groove 84. As a result, the nose-shaped projections 90 are compressed when the profiled ring 60 is inserted into the guide groove 78, thereby holding the sealing element 38 in the base body 50 of the feed shoe 28 under bias. The profiled ring 60 also includes an annular channel 92 which improves compressibility; wherein the compressibility as well as the spring bias can be adjusted by suitably sizing the annular channels 62. This improves the sealing action and also enables automatic adjustment to compensate for wear.

FIG. 8 represents a cross-sectional diagram of an sealing element 38 which is arranged above the profiled ring 60 on the base body 50 of a feed shoe. In particular, the self-adjusting, spring-biased support of the sealing element 38 on the base body 50 by way of the profiled ring 60 is evident. The profiled ring 60 which completely encircles the sealing element 38 holds the elements 80 in a defined, spring-elastic position in the basic body 50.

According to other unillustrated exemplary embodiments, the cross-section of profiled ring 60 can be different from a circular cross-section. For example, oval, trapezoidal or other suitable cross-sectional shapes are feasible. This requires a matching contour of the receiving groove 66 and the guide groove 78.

LIST OF REFERENCE SYMBOLS

10 rotary pelleting machine
12 die table
14 die plate
16 bottom die
18 top die
20 slideway
22 slideway
24 drive apparatus
26 feed device
28 feed shoe
30 pressed material
32 storage container
34 surface
36 gap
38 sealing element
40 press station
42 pressure rollers
44 rotation axis
46 direction of arrow
48 direction of movement
50 base body
52 recess
54 feed opening
56 circular path
58 contour
60 profiled ring
62 center web
64 contact surface
66 receiving groove
68 segment
70 bottom side
72 segment
74 segment
76 bottom
78 guide groove
80 topside
82 inner surface
84 annular groove
86 annular bead
88 arrow
90 nose-shaped projections
92 annular channel

The invention claimed is:

1. A pelleting machine with a die table comprising at least one die plate, dies associated with the die plate and a feed device for feeding a material to be pressed into the die plate, the feed device including a feed shoe arranged substantially parallel to a surface of the die table, wherein the feed shoe has at least one feed opening which is arranged or can be arranged in a region of the die plate, as well as a sealing device disposed between the feed shoe and the die table, wherein the sealing device comprises at least one sealing element forming a contour of the feed opening, wherein the sealing device is configured to apply a force acting in the direction of the die table to the sealing element.

2. The pelleting machine according to claim 1, wherein the at least one sealing element is attached to a base body of the feed shoe with a spring element.

3. The pelleting machine according to claim 2, wherein the spring element is a profiled ring.

4. The pelleting machine according to claim 3, wherein the base body and the at least one sealing element form complementary seats for receiving the profiled ring.

5. The pelleting machine according to claim 4, wherein the seats are formed by circumferential first and second receiving grooves which are open at a margin.

6. The pelleting machine according to claim 5, wherein the second receiving groove comprises an annular groove, in which a corresponding annular bead of the profiled ring engages.

7. The pelleting machine according to claim 1, wherein that the at least one sealing element can be installed in the feed shoe from only one side.

8. The pelleting machine according to claim 5, wherein the first receiving groove of the feed shoe is delimited by two segments which extend substantially perpendicular to a bottom side of the base body and which are located on two parallel, spaced-apart planes.

9. The pelleting machine according to claim 1, wherein an inner surface of the at least one sealing element is shaped as a funnel.

10. The pelleting machine according to claim 1, wherein the at least one sealing element comprises contact surfaces which directly abut the feed opening.

11. The pelleting machine according to claim 1, wherein the pelleting machine is a rotary pelleting machine, an eccentric pelleting machine or hydraulic pelleting machine.

12. A feed shoe for at least one pelleting machine with at least one feed opening, which is arranged or can be arranged in the region of at least one die plate, and with a sealing device for sealing the at least one feed opening with respect to a die table having the at least one die plate, wherein the sealing device comprises at least one sealing element forming the contour of the feed opening, wherein the sealing device is configured to apply a force acting in the direction of the die table to the sealing element.

13. A sealing device for a feed shoe of a pelleting machine, wherein at least one sealing element forming the contour of at least one feed opening of the feed shoe, wherein the at least one sealing element is releasably connected or can be releasably connected with a base body of the feed shoe, wherein the sealing device is configured such that a force having a direction away from the base body operates on the at least one sealing element.

* * * * *